United States Patent [19]

Tachi et al.

[11] 4,245,061

[45] Jan. 13, 1981

[54] EPOXY-MODIFIED POLYOLEFIN WAX, PROCESS FOR PREPARATION THEREOF AND THERMOSETTING RESINOUS COMPOSITION COMPRISING SAID WAX

[75] Inventors: Akihiro Tachi; Toru Tomoshige, both of Otake; Harumi Furuta, Iwakuni; Norio Matsuzawa, Ichihara, all of Japan

[73] Assignee: Mitsui Petrochemical Industries, Ltd., Tokyo, Japan

[21] Appl. No.: 967,905

[22] Filed: Dec. 11, 1978

[30] Foreign Application Priority Data

Dec. 14, 1977 [JP] Japan .................. 52-149346

[51] Int. Cl.³ ........................................ C08F 269/00
[52] U.S. Cl. ..................... 525/286; 260/28 R; 260/28.5 A; 260/28.5 B; 260/28.5 AV; 260/28.5 D; 260/348.11; 260/348.14; 260/348.23; 525/65; 525/66; 525/68

[58] Field of Search ............... 525/286, 65, 66, 68; 260/28.5 A, 28 R, 28.5 B, 28.5 AV, 28.5 D, 348.11, 348.14, 348.23

[56] References Cited

U.S. PATENT DOCUMENTS

| | | | |
|---|---|---|---|
| 3,100,758 | 8/1963 | Rave et al. | 525/286 |
| 3,453,246 | 7/1969 | Heilman | 428/507 |
| 3,876,609 | 4/1975 | Schrage et al. | 260/42.18 |

*Primary Examiner*—Melvyn I. Marquis
*Attorney, Agent, or Firm*—Sherman and Shalloway

[57] ABSTRACT

An epoxy-modified polyolefin wax, which consists of a low-molecular-weight polyolefin grafted, copolymerized and modified with an epoxy group-containing, ethylenically unsaturated compound and has a number average molecular weight of from 600 to 10,000 and an epoxy equivalent of from 200 to 100,000, is disclosed.

This epoxy-modified polyolefin wax is very valuable as a modifier for improving brittleness or adhesion (adhesiveness) in various resins, especially thermosetting resins.

10 Claims, No Drawings

EPOXY-MODIFIED POLYOLEFIN WAX, PROCESS FOR PREPARATION THEREOF AND THERMOSETTING RESINOUS COMPOSITION COMPRISING SAID WAX

BACKGROUND OF THE INVENTION

1. Field of the Invention

This invention relates to a novel epoxy-modified polyolefin wax, a process for the preparation of this wax and a thermosetting resinous composition comprising this wax as a modifier.

2. Description of the Prior Art

Polyolefin waxes such as polyethylene waxes have heretofore been broadly used as lubricants, parting agents and the like. It is known that a product formed by introducing polar groups into a polyolefin wax by oxidizing treatment or grafting treatment with an ethylenically unsaturated carboxylic acid or its anhydride such as maleic anhydride is incorporated into a thermosetting resin paint for improving flow characteristics or levelling properties.

However, most of known polyolefin waxes or acid-modified polyolefin waxes are poor in compatibility with base resins and their reactivity with base resins are low. Accordingly, resinous compositions formed by incorporating these polyolefin waxes or acid-modified polyolefin waxes into base resins are still insufficient in mechanical and chemical properties.

SUMMARY OF THE INVENTION

We found that a low-molecular-weight polyolefin wax modified and grafted with an epoxy group-containing, ethylenically unsaturated monomer has an excellent compatibility with resins used as paints, adhesives, molding materials and the like, and that when this epoxy-modified polyolefin wax is incorporated into these resins, mechanical properties such as shock resistance, heat resistance, adhesion and adhesiveness and chemical properties such as water resistance, oxidation resistance and chemical resistance can be remarkably improved in the resulting resinous compositions.

It is therefore a primary object of this invention to provide a novel epoxy-modified polyolefin wax which has an excellent compatibility with various resins.

Another object of this invention is to provide an epoxy-modified polyolefin wax which is very valuable as a modifier to be incorporated in various resins for improving mechanical properties such as shock resistance, heat resistance, adhesion and adhesiveness and chemical properties such as water resistance, oxidation resistance and chemical resistance.

Still another object of this invention to provide a novel resinous composition especially valuable as a paint, an adhesive, a molding material or the like, which comprises a thermosetting resin and an epoxy-modified polyolefin wax.

In accordance with one aspect of this invention, there is provided an epoxy-modified polyolefin wax, which consists of a low-molecular-weight polyolefin grafted, copolymerized and modified with an epoxy group-containing, ethylenically unsaturated compound and has a number average molecular weight of from 600 to 10,000 and an epoxy equivalent of from 200 to 100,000.

In accordance with another aspect of this invention, there is provided a thermosetting resinous composition comprising a thermosetting resin and 0.5 to 70 parts by weight, per 100 parts by weight of said thermosetting resin, of an epoxy-modified polyolefin wax consisting of a low-molecular-weight polyolefin grafted, copolymerized and modified with an epoxy group-containing, ethylenically unsaturated compound and having a number average molecular weight of from 600 to 10,000 and an epoxy equivalent of from 200 to 100,000.

DETAILED DESCRIPTION OF THE PREFERRED EMBODIMENTS

The epoxy-modified polyolefin wax of this invention should have a number average molecular weight of from 600 to 10,000, preferably from 700 to 6,000, especially preferably from 1,000 to 4,000, and an epoxy equivalent of from 200 to 100,000, preferably from 200 to 10,000, especially preferably from 200 to 6,000. In order to improve the compatibility of the epoxy-modified polyolefin wax with various resins and mechanical and chemical properties of the resulting resinous compositions, it is very important that these requirements of the number average molecular weight and epoxy equivalent should be satisfied.

More specifically, epoxy-modified olefin resins having a number average molecular weight exceeding the above range, for example, epoxy-modified olefin resins disclosed in Japanese Pat. No. 31726/77 and Japanese patent application Laid-Open Specification No. 551/76. are very poor in the compatibility with other resins such as epoxy resins. Further, resinous compositions including such high-molecular-weight epoxy-modified olefin resin have a defect that the viscosity is drastically increased in the molten state or in the form of a solution and their processability as paints, adhesives or molding materials is reduced. Moreover, these resinous compositions are still insufficient in appearance characteristics, mechanical properties such as shock resistance and chemical properties such as water resistance. When the number average molecular weight is too low and below the above range, mechanical properties such as adhesiveness and shock resistance and chemical properties such as water resistance, oxidation resistance and chemical resistance are degraded in resinous compositions including such epoxy-modified polyolefin wax. In the epoxy-modified polyolefin wax of this invention, the epoxy equivalent is closely related to the reactivity and compatibility with a thermosetting resin in which the epoxy-modified polyolefin wax is incorporated. When an epoxy-modified polyolefin wax having an epoxy equivalent included within the above range is employed, preferred reactiviy and compatibility can be attained in combination.

An epoxy-modified polyolefin wax especially suitable for attaining the objects of this invention has a haze less than 3.1%, especially less than 3.0%, in the molten state. The haze referred to in the instant specification and claims in one determined by melting a 2/8 blend of sample/Paraffin (melting point=48°–50° C.) at 180° C., casting the melt on a heated measurement cell and performing the measurement according to ASTM D-1003-53.

The above-mentioned haze is closely related to the homogeneousness of grafting of the epoxy group-containing, ethylenically unsaturated compound to the polyolefin wax trunk polymer. More specifically, an epoxy-modified polyolefin wax in which the epoxy group-containing, ethylenically unsaturated compound is not homogeneously grafted to the trunk of the polyolefin wax but molecules of such saturated compound are polymerized with one another is insufficient in the transparency in the molten state and has an opaque appearance. Further, such modified polyolefin wax is poor in the compatibility with various resins and resinous compositions including such modified polyolefin wax are insufficient in the adhesiveness, adhesion and other properties. In contrast, an epoxy-modified polyolefin wax having the transmittance and haze in the above-mentioned ranges is excellent in the compatibility with various resins and high improvements of the above-mentioned properties can be attained by the use of such epoxy-modified polyolefin wax.

The epoxy-modified polyolefin wax of this invention is prepared by graft-copolymerizing an epoxy group-containing, ethylenically unsaturated compound to a low-molecular-weight polyolefin wax. Ordinarily, the epoxy-modified polyolefin wax is prepared by grafting, copolymerizing and modifying an unmodified low-molecular-weight polyolefin wax having a number average molecular weight of 400 to 9,000, preferably 600 to 5,000, with an epoxy group-containing, ethylenically unsaturated compound in the presence or absence of a radical initiator in the state dissolved in a solvent or in the molten state.

As the starting unmodified low-molecular-weight polyolefin wax, there can be mentioned, for example, olefin homopolymers such as polyethylene, polypropylene, poly-1-butene, poly-4-methyl-1-pentene, polybutadiene and polyisoprene, and olefin copolymers such as ethylene/propylene copolymers, ethylene/1-butene copolymers, ethylene/4-methyl-1-pentene copolymers, ethylene/butadiene copolymers, ethylene/vinyl acetate copolymers, propylene/ethylene copolymers, propylene/1-butene copolymers, propylene/4-methyl-1-pentene copolymers and ethylene/propylene/diene copolymers, each having a number average molecular weight included within the above-mentioned range. Among these starting unmodified low-molecular-weight polyolefin waxes, there are preferably employed low-molecular-weight polyolefin waxes having a number average molecular weight included within the above-mentioned range and an ethylene content of at least 70 mole % and low-molecular-weight polypropylene waxes having a number average molecular weight included within the above-mentioned range.

Methods for preparing these polyolefin waxes are known. For example, they can be prepared by a process for thermally decomposing a high-molecular-weight polyethylene or polypropylene or according to the Fisher Tropsh synthesis process. Further, they may be prepared by polymerizing ethylene or propylene in the presence of a Ziegler catalyst and a molecular weight modifier such as hydrogen.

In this invention, as the epoxy group-containing, ethylenically unsaturated compound, there can be used compounds having in the molecule at least one graft-copolymerizable unsaturated carbon-to-carbon bond and at least one epoxy group. For example, there can be mentioned glycidyl esters of unsaturated monocarboxylic acids such as glycidyl acrylate, glycidyl methacrylate and glycidyl p-styrylcarboxylate, mono- and polyglycidyl esters of unsaturated polycarboxylic acids such as maleic acid, itaconic acid, citraconic acid, butenetricarboxylic acid, endo-cis-bicyclo[2,2,1]hepto-5-ene-2,3-dicarboxylic acid and endo-cis-bicyclo[2,2,1]hepto-5-ene-2-methyl-2,3-dicarboxylic acid, unsaturated glycidyl ethers such as allyl glycidyl ether, 2-methylallyl glycidyl ether, o-allylphenyl glycidyl ether, m-allylphenyl glycidyl ether, p-allylphenyl glycidyl ether, isopropenylphenyl glycidyl ether, o-vinylphenyl glycidyl ether, m-vinylphenyl glycidyl ether and p-vinylphenyl glycidyl ether, and 2-(o-vinylphenyl)ethylene oxide, 2-(p-vinylphenyl)ethylene oxide, 2-(o-vinylphenyl)propylene oxide, 2-(p-vinylphenyl)-propylene oxide, 2-(o-allylphenyl)ethylene oxide, 2-(p-allylphenyl)ethylene oxide, 2-(o-allylphenyl)propylene oxide, 2-(p-allylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxyl-hexene, vinylcyclohexene monoxide and allyl-2,3-epoxycyclopentyl ether.

Among these epoxy group-containing, ethylenically unsaturated compounds, there are preferably employed compounds represented by the following formula:

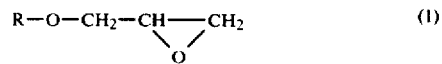

$$R-O-CH_2-CH\underset{O}{\overset{}{\diagdown\diagup}}CH_2 \quad (1)$$

wherein R stands for a monovalent hydrocarbon group containing a polymerizable ethylenically unsaturated bond. Especially preferred examples of the compound represented by the formula (1) include allyl glycidyl ether, 2-methylallyl glycidyl ether, isopropenylphenyl glycidyl ether and allylphenyl glycidyl ether.

Another preferred class of epoxy group-containing, ethylenically unsaturated compounds are those represented by the following formula:

$$R-\underset{\underset{O}{\overset{R'}{|}}}{C}\underset{}{\overset{}{\diagdown\diagup}}CH_2 \quad (2)$$

wherein R stands for a monovalent hydrocarbon group containing a polymerizable ethylenically unsaturated bond, and R' stands for a hydrogen atom or an alkyl group having up to 4 carbon atoms. Among compounds represented by the formula (2), 2-(allylphenyl)ethylene oxide is especially preferred.

Such epoxy group-containing, ethylenically unsaturated compound is reacted with the polyolefin wax in such an amount that the above-mentioned requirement of the epoxy equivalent should be satisfied.

In practising the graft polymerization, it is desired that a homopolymer of the epoxy group-containing, ethylenically unsaturated compound will not be formed by polymerization of molecules of such unsaturated compound. Compounds represented by the above formula (1) or (2) are especially suitable for attaining this object. Further, this object can be conveniently attained by carrying out the graft polymerization while feeding continuously or intermittently the unsaturated epoxy compound at a speed of $10^{-5}$ to $10^{-2}$ mole/hr. especially $4 \times 10^{-5}$ to $10^{-3}$ mole/hr. per gram of the starting low-molecular-weight polyolefin wax.

The graft polymerization is carried out in an inert atmosphere at a temperature of 80° to 200° C., especially 120° to 180° C., under agitation or kneading under such condition that the starting wax is flowable. For example, when the starting wax has a melting point higher than 80° C., the starting wax is heated at a temperature higher the melting point thereof, or a hydrocarbon other than an alkyl aromatic hydrocarbon is added as a solvent so as to lower the pour point. In this invention, it is preferred that the graft polymerization for obtaining the epoxy-modified polyolefin wax be carried out substantially in the absence of the solvent. Namely, it is preferred that the amount of the solvent be smaller than 30% by weight based on the starting polyolefin wax. It is most preferred that the graft polymerization be carried out in the absence of the solvent in the state where the starting polyolefin wax is molten.

As the radical initiator, a known peroxide or azonitrile is used in an amount of $10^{-2}$ to 10% by weight, especially 0.1 to 10% by weight, based on the starting polyolefin wax. It is preferred that the radical initiator be added to the reaction mixture continuously or intermittently.

The unreacted unsaturated epoxy monomer, oligmers thereof, the radical initiator and decomposition products thereof may be removed from the reaction mixture obtained according to the above-mentioned process, if desired. For this purpose, there may be adopted a method comprising maintaining a reduced pressure in a reaction vessel, a method comprising continuously feeding the reaction mixture into a film evaporator maintained under a reduced pressure, a method comprising dissolving the reaction mixture in a solvent such as acetone, methylethyl ketone, methylisobutyl ketone, dioxane, methyl alcohol, ethyl alcohol, isopropyl alcohol, an acetic acid ester, chloroform or benzene and then precipitating the reaction product, and a method comprising dipping reaction mixture in water and recovering the washed reaction product. Thus, the intended epoxy-modified polyolefin wax is obtained.

The epoxy-modified polyolefin wax of this invention has several novel properties that are not observed in known polyolefin waxes. Namely, the epoxy-modified polyolefin wax of this invention retain properties inherent of waxes and has an excellent adhesiveness to various metals such as steel, aluminum, copper, zinc and tin-plated steel and also to polyester resins such as polyethylene terephthalate and polybutylene terephthalate and polyamide resins such as various nylons. Therefore, when the epoxy-modified polyolefin wax is incorporated into a paint or adhesive, the adhesion or adhesiveness to a substrate can be remarkably improved.

Further, the epoxy-modified polyolefin wax of this invention is very effective as a dispersant or dispersing assistant for improving the dispersibility of a pigment, a filler, an aggregate or the like into a resin, a paint, an ink vehicle or the like.

Still further, the epoxy-modified polyolefin wax of this invention is very excellent in compatibility with various resins, especially thermosetting resins, and when the epoxy-modified polyolefin wax of this invention is incorporated into such resins, the coating property, processability and adaptability to various operations can be remarkably improved and simultaneously, mechanical properties such as brittleness and chemical properties can be prominently improved in paints, adhesives and molding materials.

The epoxy-modified polyolefin wax of this invention can be incorporated into a thermosetting resin in an amount of 0.5 to 70 parts by weight, especially 0.5 to 50 parts by weight, per 100 parts by weight of the thermosetting resin.

The kind of the thermosetting resin in which the epoxy-modified polyolefin wax of this invention is incorporated is not particularly critical, but the epoxy-modified polyolefin wax of this invention preferably is incorporated into at least one thermosetting resin selected from the group consisting of phenol-formaldehyde resins, melamine-formaldehyde resins, urea-formaldehyde resins, urethane resins, unsaturated polyester resins and epoxy resins. As the most preferred thermosetting resin for attaining the objects of this invention, there can be mentioned epoxy resins and a mixture of an epoxy resin with other thermosetting resin exemplified above.

Epoxy resins have heretofore been broadly used in the fields of adhesives, paints and surface-protecting coating agents. Epoxy resins are excellent in the adhesiveness to metals, woods and other substrates, but since they are generally poor in the shock resistance, cracks are formed under shocks during use or peeling is readily caused.

When the epoxy-modified polyolefin wax of this invention is incorporated into epoxy resins, the shock resistance can be improved without degradation of excellent adhesiveness inherent of epoxy resins and simultaneously, chemical properties such as water resistance can be further improved.

Versatile and ordinary epoxy resins consisting of compounds containing in the molecule at least two epoxy groups can be used. Of course, epoxy-modified low-molecular-weight polyolefins such as those of this invention and epoxy-containing polymers having a polyolefin skeleton, such as epoxy-containing olefin polymers obtained by directly copolymerizing epoxy group-containing unsaturated compounds such as mentioned above in polymerizing olefins such as ethylene are excluded from the epoxy resins that can be used in this invention. As specific examples of the epoxy resin that can be used in this invention, there can be mentioned epoxy resins consisting of glycidyl ethers of polyphenols such as bisphenol A, bisphenol F and 1,1,2,2-tetrakis(4'-hydroxyphenyl)ethane, epoxy resins consisting of glycidyl ethers of polyhydric phenols such as cateohol, resorcinol, hydroquinone and phloroglucinol, epoxy resins consisting of glycidyl ethers of polyhydric alcohols such as ethylene glycol, butane diol, glycerol, erythritol and polyoxyalkylene glycol, novolak type epoxy resins, cyclic aliphatic epoxy resins such as vinylcyclohexene dioxide, limonene dioxide and dicyclopentadiene dioxide, epoxy resins consisting of polyglycidyl esters of condensates of esters of polycarboxylic acids such as phthalic acid and cyclohexane-1,2-dicarboxylic acid, and polyglycidyl amine type epoxy resins.

Among these epoxy resins, in this invention, there are preferably used epoxy resins consisting of a condensate of a polyfunctional active hydrogen-containing compound with an epihalohydrin, especially epoxy resins consisting of a glycidyl ether of a polyphenol such as bisphenol A or bisphenol F and a novolak type epoxy resin.

A curing agent or a curing promotor is incorporated into the thermosetting resinous composition of this invention according to need. Further, known additives such as a filler, a pigment, a stabilizer, a thixotropic agent, a flow modifier and a dispersant may be incorporated according to known recipes.

For example, when an epoxy resin is used as the thermosetting resin, all the compounds known as curing agents for epoxy resins may be used as the curing agent. As the curing agent that can be used in this invention, there can be mentioned, for example, linear aliphatic polyamines such as diethylene triamine, triethylene tetramine, tetraethylene pentamine, dipropylene diamine and diethylaminopropylamine, cyclic aliphatic polyamines, aliphatic polyamine adducts, ketoimine, modified aliphatic amines, aromatic amines, aromatic modified amines, tertiary amine type curing agents, mercaptan type curing agents, acid anhydride type curing agents, copolymers containing an acid anhydride group such as ethylene/maleic anhydride copolymers, compounds containing a phenolic hydroxyl group such as precondensates of phenolic resins, and other curing compounds such as dicyandiamide, melamine and boron trifluoride complexes. Among these curing agents, there are preferably employed dicyandiamide, an aromatic polyamine such as diaminodiphenylmethane and a boron trifluoride-amine complex.

An acid curing agent such as phosphoric acid can be used for a resol type phenol-formaldehyde resin, and a curing agent such as hexamethylene tetramine can be used for a novolak type phenol formaldehyde resin.

For incorporation of the epoxy-modified polyolefin wax into the thermosetting resin, there may be adopted a method in which powders of both the components are dry-blended, a method in which both the components are mixed in the solution state and a method in which both the components are kneaded in the molten state. In each of these methods, an excellent adaptability to the mixing operation can be attained.

The thermosetting resinous composition of this invention can be used in the fields of paints, surface-coating agents, adhesives and molding materials. For example, for application of the thermosetting resinous composition of this invention, there may be adopted an electrostatic coating method, a fluidized bed dip coating method, a press molding method, an extrusion molding method, an injection molding method, a casting method, an impregnation method, a solution coating method and the like.

As pointed out hereinbefore, the epoxy-modified polyolefin wax of this invention is excellent as a modifier for thermosetting resins. The modified wax of this invention is excellent also in the compatibility with thermoplastic resins such as polyvinyl chloride, polyethylene, polypropylene, ethylene/propylene copolymers and other polyolefins. Accordingly, when the epoxy-modified polyolefin wax of this invention is incorporated into a polyolefin in an amount of 0.5 to 50% by weight based on the polyolefin, the stress crack resistance, adhesiveness and reactivity of the polyolefin can be improved. When the epoxy-modified polyolefin wax of this invention is incorporated in a vinyl chloride resin, it exerts excellent properties as the lubricant and stabilizer of the vinyl chloride resin. Still further, the epoxy-modified polyolefin wax of this invention can be effectively used for a road-surfacing paint. For example, when the epoxy-modified polyolefin wax of this invention is incorporated into a hot-melt type road-surfacing paint comprising a binder resin such as a hydrocarbon resin, a pigment and an aggregate in an amount of 0.01 to 20 parts by weight per 100 parts by weight of the binder resin, the effect of preventing sedimentation and separation of the aggregate in the paint can be remarkably enhanced, and the operation adaptability of the paint can be remarkably improved.

This invention will now be described in detail by reference to the following Examples that by no means limit the scope of the invention.

EXAMPLE 1

Preparation of Epoxy-Modified Wax

Ethylene was polymerized at 180° C. in hexane as the solvent in the presence of hydrogen by using a catalyst consisting of titanium tetrachloride and triethyl aluminum supported on anhydrous magnesium chloride, and volatile substances were removed from the reaction mixture to recover a linear polyethylene wax having a number average molecular weight of 1250, a density of 0.97 and a melt viscosity of 70 cps (as measured at 140° C.) and containing 0.50 internal double bond per 1000 carbon atoms. Then, 300 g of the so prepared wax was charged in a glass vessel having a capacity of 1 liter and equipped with a stirring rod, and externally heated by an oil bath to melt the wax. At 160° C., nitrogen gas was blown into the vessel from the bottom thereof for 30 minutes at a rate of 40 l/hr to substitute the atmosphere in the vessel by nitrogen. Then, at a temperature of 160° C. and under agitation at 500 rpm, 54.8 g of allyl glycidyl ether and 12.0 g of di-tert-butyl peroxide were fed into the vessel from different conduits for 8 hours at rates of $2.0 \times 10^{-4}$ mole/g.hr and $0.34 \times 10^{-4}$ mole/g.hr, respectively.

After completion of feeding of allyl glycidyl ether and di-tert-butyl peroxide, reaction was further conducted for 1 hour. After completion of the reaction, the reaction mixture was maintained at a temperature of 160° C. and a pressure of 5 mmHg under agitation at 500 rpm for 2 hours to remove volatile substances such as unreacted allyl glycidyl ether and decomposition products of di-tert-butyl peroxide and recover a homogeneous transparent melt.

The so formed melt was transferred onto a porcelain dish and cooled and solidified. The resulting solid was pulverized by an appropriate pulverizer to obtain a light-yellow powdery modified polyethylene wax.

The so obtained modified polyethylene wax was purified by extraction with acetone and it was then subjected to infrared absorption spectrum analysis and oxygen analysis. It was found that the allyl glycidyl ether content in the modified polyethylene wax 10.6% by weight (0.930 milligram equivalent/g) and that the modified polyethylene wax had a number average molecular weight of 1700 and a density of 0.97. Thermosetting Resinous Composition:

To a mixture of 150 g of a bisphenol type epoxy resin (EPOMIX ® R-304 having an epoxy equivalent of 875 to 1000 and a softening point of 93° to 140° C.; product of M.P.I. Epoxy Corp.) and 50 g of a phenol type epoxy resin (EPOMIX ® R-301 having an epoxy equivalent of 450 to 525 and a softening point of 65° to 75° C.; product of M.P.I. Epoxy Corp.) was added 8.8 g of a dicyandiamide type curing agent (DX-108 ® manufactured by Shell Checmical Co.), and 20 g of the allyl glycidyl ether-modified polyethylene wax prepared according to the above-mentioned method was added to the mixture. The mixture was roll-blended at 130° C. for 15 minutes and then pulverized to obtain a thermosetting resinous composition. The composition was heated and cured at 180° C. under a pressure of 100 Kg/cm² for 30 minutes. The water absorption, heat distortion temperature and flexural strength of the so formed cured molded product were measured to obtain results shown in Table 1.

EXAMPLES 2 AND 3 AND COMPARATIVE EXAMPLES 1 TO 3

Preparation of Epoxy-Modified Polyolefin Wax

The reaction was carried out in the same manner as in Example 1 except that a linear polyethylene wax having a number average molecular weight of 2300, a density of 0.97 and a melt viscosity of 550 cps (as measured at 140° C.) and containing 0.50 internal double bond per products were measured to obtain results shown in Table 1.

TABLE 1

|  | Example 1 | Example 2 | Example 3 | Comparative Example 1 | Comparative Example 2 | Comparative Example 3 |
|---|---|---|---|---|---|---|
| Thermosetting Composition | | | | | | |
| Amounts (parts by weight) of Epoxy Resins | | | | | | |
| R-304 ® | 150 | 150 | 150 | 150 | 150 | 150 |
| R-301 ® | 50 | 50 | 50 | 50 | 50 | 50 |
| Modified Low-Molecular-Weight Polyolefin | | | | | | |
| Kind | allyl glycidyl ether-grafted polyethylene wax | allyl glycidyl ether-grafted polyethylene wax | isopropenylphenyl glycidyl ether-grafted polyethylene wax | unmodified polyethylene wax | oxidized polyethylene wax | not added |
| Amounts (parts by weight) | 20 | 20 | 20 | 20 | 20 | 0 |
| Number Average Molecular Weight[1] | 1700 | 3200 | 2000 | 1250 | 1500 | — |
| Epoxy equivalent | 1080 | 1750 | 2180 | 0 | 0 | 0 |
| Haze (%) | 1.7 | 1.6 | 1.6 | | | |
| Amount(parts by weight) of Curing Agent(DX-108) | 8.8 | 8.8 | 8.8 | 8.8 | 8.8 | 8.8 |
| Properties of Heat-Cured Molded Product | | | | | | |
| Water absorption(%)[2] | 0.16 | 0.19 | 0.18 | 0.26 | 0.28 | 0.32 |
| Heat Distortion Temperature(°C.)[3] | 88.0 | 87.0 | 88.0 | 67.5 | 72.0 | 82.0 |
| Flexural Strength (Kg/cm$^2$)[4] | 840 | 820 | 840 | 510 | 800 | 1100 |

Note
[1] The number average molecular weight was measured according to the ebulliometer method.
[2] The water absorption was measured according to the method of JIS K-6911 5-2-6.
[3] The heat distortion temperature was measured according to the method of ASTM D-648 under load of 264 psi.
[4] The flexural strength was determined according to the method of ASTM D-790.

1000 carbon atoms was used instead of the linear polyethylene was used in Example 1. A homogeneous transparent melt was obtained (Example 2).

The allyl glycidyl ether content in the so obtained modified wax 6.5% by weight (0.570 milligram equivalent/g) and the modified wax had a number average molecular weight of 3200 and a density of 0.97.

The reaction was carried out in the same manner as in Example 1 except that 91.2 g of p-isopropenylphenyl glycidyl ether was used instead of the allyl glycidyl ether used in Example 1. A homogeneous transparent melt was obtained (Example 3).

The p-isopropenylphenyl glycidyl ether content in the so obtained modified wax was 8.7% by weight (0.763 milligram equivalent/g), and the modified wax had a number average molecular weight of 2000 and a density of 0.97. Thermosetting Resinous Composition:

Thermosetting resinous compositions and cured molded products were prepared under the same conditions as in Example 1 except that the allyl glycidyl ether-modified polyethylene wax prepared above (Example 2) or the p-isopropenylphenyl glycidyl-modified polyethylene wax prepared above (Example 3) was used instead of the allyl glycidyl ether-modified polyethylene wax used in Example 1.

For comparison, the above procedures were repeated by using a polyethylene wax having no polar group (number average molecular weight = 1250, density = 0.97) (Comparative Example 1) or an oxidized polyethylene wax (acid value = 27.2, number average molecular weight = 1500 and density = 0.98) (Comparative Example 2) instead of the allyl glycidyl ether-modified polyethylene wax used in Example 1 or without using any modified polyethylene wax (Comparative Example 3).

The water absorption, heat distortion temperature and flexural strength of each of these five cured molded

EXAMPLE 4

An allyl glycidyl ether-grafted modified wax having an allyl glycidyl ether content of 2.7% by weight (0.23 milligram equivalent/g) and a number average molecular weight of 3400 was prepared in the same manner as in Example 1 except that a propylene/ethylene copolymer wax (Viscol ® 550P manufactured by Sanyo Kasei K.K.) was used as the starting polyolefin wax. Then, 20 g of the so obtained modified wax was added to a mixture of 150 g of the above-mentioned EPOMIK ® R-304, 50 g of the abovementioned EPOMIK ® R-301 and 20 g of an aliphatic epoxy resin (EPOMIK ® R-098 having an epoxy equivalent of 148 to 156; product of M.P.I. Epoxy Corp.), and in the same manner as described in Example 1, a thermosetting resinous composition was prepared from this mixture. Then, the composition was heated and cured at 180° C. under a pressure of 100 Kg/cm$^2$ for 30 minutes, and the properties of the cured molded product were measured. It was found that the product had a water absorption of 0.21%, a heat distortion temperature of 86.0° C. and a flexural strength of 700 Kg/cm$^2$.

EXAMPLE 5

Ethylene was polymerized at 180° C. in hexane as a solvent in the presence of hydrogen by using a catalyst consisting of titanium tetrachloride and triethyl aluminum supported on anhydrous magnesium chloride and volatile substances were removed from the reaction mixture to obtain a linear polyethylene wax having a number average molecular weight of 1250, a density of 0.970 and a melt viscosity of 550 cps (as measured at 140° C.) and containing 0.50 internal double bond per 1000 carbon atoms. Then, 300 g of the wax was charged in a glass vessel having a capacity of 1 liter and equipped with a stirring rod. The vessel was externally heated on an oil bath to melt the wax and nitrogen gas was blown into the vessel from the bottom thereof at a flow rate of about 40 l/hr for 30 minutes to replace the atmosphere by nitrogen. At 160° C. under agitation, 54.8 g of allyl glycidyl ether and 120.0 g of di-tert-butyl peroxide were fed into the vessel from different conduits for 8 hours at feed rates of $2.0 \times 10^{-4}$ mole/g.hr and $0.34 \times 10^{-4}$ mole/g.hr, respectively. After completion of feeding of allyl glycidyl ether and di-tert-butyl peroxide, the reaction was further conducted for 1 hour. After completion of the reaction, the reaction temperature was maintained at 160° C. under a pressure of 5 mmHg for 2 hours to remove volatile substances such as unreacted allyl glycidyl ether and decomposition products of the peroxide and obtain a homogeneous transparent melt. The melt was transferred onto a porcelain dish and cooled and solidified. The solid was pulverized by an appropriate pulverizer to obtain a light-yellow powdery modified polyethylene wax.

The modified polyethylene wax was purified by extraction with acetone and the purified product was subjected to infrared absorption spectrum analysis, carbon$_{13}$ nuclear magnetic resonance spectrum analysis and oxygen analysis. It was found that the epoxy content in the modified wax was $1.06 \times 10^{-3}$ gram equivalent per g of the modified polyethylene wax, and that the epoxy monomer was introduced into the polyethylene chain in the monomolecular form and the epoxy group of the epoxy monomer was not substantially ring-opened. It also was found that the modified polyethylene wax had a haze of 1.8%, a number average molecular weight of 1800, a density of 0.970 and a melt viscosity of 268 cps (as measured at 140° C.).

In a glass vessel having a capacity of 500 ml. 0.5 g of the so prepared crude modified polyethylene wax, 4.5 g of a bisphenol A type epoxy resin EPOMIK ® R-301 manufactured by M.P.I. Epoxy Corp.), 0.5 g of diaminodiphenylmethane and 100 g of methylisobutyl ketone were mixed, and the temperature was elevated to 120° C. and immediately, the mixture was cooled to form a dispersion. The dispersion was coated on a degreased steel plate having a thickness of 0.8 mm by a bar coater (No. 22) and baked at 180° C. for 10 minutes to form a resin layer having a thickness of 5 μm. Then, a powdery polyethylene (NEOZEX® 25100 manufactured by Mitsui Petrochemical, Ltd; melt index = 10) was electrostatically coated on the resin layer and baked at 200° C. for 15 minutes to obtain a coating resin layer having a thickness of 150 μm. Then, the coated steel plate was subjected to the peel test at room temperature (25° C.) under conditions of a peel angle of 180° and a pulling speed of 50 mm/min. The peel strength was 2 Kg/cm and the coating resin layer was tightly bonded to the steel plate.

EXAMPLES 6 TO 8

Homogeneous transparent metls were prepared under the same conditions as in Example 5 except that a linear polyethylene wax having a number average molecular weight of 2300, a density of 0.970 and a melt viscosity of 70 cps (as measured at 140° C.) and containing 0.50 internal double bond 1000 carbon atoms (Example 6) or a branched polyethylene wax having a number average molecular weight of 1250, a density of 0.920 and a melt viscosity of 70 cps (as measured at 140° C.) and containing 20 methyl groups and 0.50 internal double bond per 1000 carbon atoms was used instead of the linear polyethylene wax used in Example 5 or 6.9 g of 2,5-dimethyl-2,5-di-(tert-butylperoxy)-hexene-3 (Example 8) was used instead of di-tert-butyl peroxide used in Example 5.

The epoxy group content, melt viscosity, transmittance and haze of each of the so obtained modified polyethylene waxes were shown in Table 2.

By using the so prepared modified polyethylene waxes, polyethylene/steel plate laminates were prepared in the same manner as described in Example 5, and when the peel strength was determined under the conditions described in Example 5, it was found that the peel strengths of the liminates obtained in Examples 6 to 8 were 2.5 Kg/cm, 1.3 Kg/cm and 1.8 Kg/cm, respectively.

EXAMPLE 9 AND COMPARATIVE EXAMPLE 4

A homogeneous transparent melt was prepared under the same conditions as in Example 5 except that 54.8 g of allyl glycidyl ether and 6.0 g of di-tert-butyl peroxide were fed at rates of $3.6 \times 10^4$ mole/g.hr and $0.30 \times 10^{-4}$ mole/g.hr, respectively (Example 9).

A modified polyethylene wax was prepared in the same manner as in Example 5 except that 54.8 g of allyl glycidyl ether was added at one time prior to initiation of the reaction and 6.0 g of di-tert-butyl peroxide was fed at the same rate as in Example 9 (Comparative Example 4). In this comparative run, the melt left after removal of the volatile components in vacuo was opaque, and from results of C$_{13}$ nuclear magnetic resonance spectrum analysis, it was found that the grafted epoxy monomer was introduced into the polyethylene chain in the state where molecules of the epoxy monomer were polymerized with one another.

By using the so prepared two modified polyethylene waxes, polyethylene/steel plate laminates were prepared in the same manner as in Example 5, and the peel test was carried out. It was found that the peel strengths of the products of Example 9 and Comparative Example 4 were 0.9 Kg/cm and 0.2 Kg/cm, respectively.

EXAMPLE 10 AND COMPARATIVE EXAMPLE 5

A homogeneous transparent melt was prepared in the same manner as in Example 5 except that 91.2 g of p-isoprophenylphenyl glycidyl ether was used and fed at a rate of $2.0 \times 10^{-4}$ mole/g.hr instead of allyl glycidyl ether used in Example 5 (Example 10).

The modification reaction was carried out under the same conditions as in Example 5 except that 68.3 g of glycidyl methacrylate was fed at a rate of $2.0 \times 10^{-4}$ mole/g.hr instead of allyl glycidyl ether used in Example 5 (Comparative Example 5). While the reaction advanced, a large amount of a homopolymer of glycidyl methacrylate was formed in the gas phase in the reaction vessel and the homopolymer adhered to the vessel wall. The melt left after removal of the volatile components in vacuo was opaque.

In the same manner as described in Example 5, polyethylene/steel plate laminates were prepared and the peel test was carried out. It was found that the peel strengths of the products of Example 10 and Comparative Example 5 were 1.4 Kg/cm and 0.1 Kg/cm, respectively.

EXAMPLES 11 AND 12

Homogeneous transparent melts were prepared under the same conditions as in Example 5 except that a polyethylene wax prepared according to the Fisher method, which had a number average molecular weight of 400, a density of 0.946 and a melt viscosity of 8 cps (as measured at 140° C.) and contained 13.1 methyl groups and 0.50 internal double bond per 1000 carbon atoms (Example 11) or a polyethylene wax prepared by thermal decomposition of high pressure method polyethylene, which had a number average molecular weight of 3000, a density of 0.924 and a melt viscosity of 240 cps (as measured at 140° C.) and contained 20.7 methyl groups and 4.20 internal double bonds per 1000 carbon atoms (Example 12) was used instead of the linear polyethylene wax used in Example 5.

Polyethylene/steel plate laminates were prepared by using the so obtained modified polyethylene waxes in the same manner as described in Example 5, and the peel test was carried out. It was found that the peel strengths of the products obtained in Examples 11 and 12 were 0.6 Kg/cm and 0.1 Kg/cm, respectively.

Results obtained in Examples 5 to 12 and Comparative Examples 4 and 5 are collectively shown in Table 2.

TABLE 2

| Items | Example 5 | Example 6 | Example 7 | Example 8 | Example 9 | Comparative Example 4 | Example 10 | Comparative Example 5 | Example 11 | Example 12 |
|---|---|---|---|---|---|---|---|---|---|---|
| Synthesis Process of Starting Wax | Ziegler process | Ziegler process | Ziegler process | Ziegler process | Ziegler Process | Ziegler process | Ziegler process | Ziegler process | Fisher process | thermal decomposition process |
| Number Average Molecular Weight of Starting Wax | 1250 | 2300 | 1250 | 1250 | 1250 | 1250 | 1250 | 1250 | 400 | 3000 |
| Density of Starting Wax | 0.970 | 0.970 | 0.970 | 0.970 | 0.970 | 0.970 | 0.970 | 0.970 | 0.946 | 0.924 |
| Number of Methyl Groups per 1000 Carbon Atoms | 0 | 0 | 20.0 | 0 | 0 | 0 | 0 | 0 | 13.1 | 20.7 |
| Number of Internal Double Bonds per 1000 Carbon Atoms | 0.50 | 0.50 | 0.50 | 0.50 | 0.50 | 0.50 | 0.50 | 0.50 | 0.50 | 4.20 |
| Melt Viscosity (140° C.) of Starting Wax[1] | 70 | 550 | 70 | 70 | 70 | 70 | 70 | 70 | 8 | 240 |
| Epoxy Monomer | allyl glycidyl ether | allyl glycidyl ether | allyl glycidyl ether | allyl glycidyl ether | allyl glycidyl ether | allyl glycidyl ether | p-isopropenyl phenyl glycidyl ether | glycidyl methacrylate | allyl glycidyl ether | allyl glycidyl ether |
| Initiator | di-tert-butyl peroxide | di-tert-butyl peroxide | di-tert-butyl peroxide | 2,5-dimethyl-2,5-di(tert-butylperoxy)-hexene-3 | di-tert-butyl peroxide | di-tert-butyl peroxide | di-tert-butyl peroxide | di-tert-butyl peroxide | di-tert-butyl peroxide | di-tert-butyl peroxide |
| Feed Rate ($10^{-4}$ mole/g·hr) of Epoxy Monomer | 2.0 | 2.0 | 2.0 | 2.0 | 3.6 | added at one time | 2.0 | 2.0 | 2.0 | 2.0 |
| Feed Rate ($10^{-4}$ mole/g·hr) of Initiator | 0.34 | 0.34 | 0.34 | 0.34 | 0.30 | 0.30 | 0.34 | 0.34 | 0.34 | 0.34 |
| Number Average Molecular Weight of Modified Wax | 1800 | 3500 | 2000 | 1800 | 1600 | 1700 | 2000 | 2400 | 500 | 3700 |
| Density of Modified Wax | 0.974 | 0.973 | 0.922 | 0.973 | 0.972 | 0.970 | 0.972 | 0.970 | 0.949 | 0.924 |
| Melt Viscosity (140° C.) of Modified Wax[1] | 268 | 1650 | 248 | 256 | 198 | 160 | 197 | 352 | 8 | 1305 |
| Epoxy Group Content (mg equivalent/g) | 1.06 | 0.96 | 0.94 | 0.98 | 0.69 | 0.50 | 0.76 | 0.21 | 0.63 | 0.15 |
| Haze (%) of Modified Wax | 1.8 | 1.7 | 1.7 | 1.8 | 1.8 | 3.2 | 1.6 | 3.8 | 2.0 | 0.8 |
| Grafting Ratio (%) of Epoxy Monomer | 78.5 | 71.1 | 69.6 | 72.6 | 51.1 | 37.0 | 61.8 | 16.0 | 46.7 | 11.1 |
| 180° Peel Strength (kg/cm) of Polyethylene to Steel Plate | 1.8 | 2.0 | 2.5 | 1.3 | 1.8 | 0.2 | 1.4 | 0.1 | 0.6 | 0.1 |

Note
[1] The melt viscosity was measured at 140° C. by a Brookfield rotational viscometer.

EXAMPLE 13

In the same manner as described in Example 1, an epoxy-modified polyethylene wax having a number average molecular weight of 1800, an allyl glycidyl ether content of 11.1% by weight (1.154 milligram equivalent/g) and a density of 0.97 was prepared. Then, 10 parts by weight of this allyl glycidyl ether-modified polyethylene wax was incorporated into 100 parts by weight of a novolak type phenolic resin, and the composition was kneaded for 3 minutes by a hot roll maintained at 110° C. Then, 50 parts by weight of a wood flour and 12.5 parts by weight of hexamethylene tetramine were added to the composition, and the mixture was further kneaded for 2 minutes. Then, the kneaded composition was pulverized and passed through a 32-mesh shieve. The flexural strength (ASTM D-790) and impact strength (ASTM D-256) of the so obtained phenolic resin composition were measured. It was found that the flexural strength (strength at break) was 692 Kg/cm$^2$ and the impact strength (Izod) was 7.6 ft.lb.

COMPARATIVE EXAMPLE 6

A phenolic resin composition was prepared in the same manner as in Example 13 except that the epoxy-modified polyethylene wax was not added to the phenolic resin. It was found that the flexural strength (at break) and impact strength (Izod) of the so prepared composition was 600 Kg/cm$^2$ and 48 ft.lb, respectively.

What we claim is:

1. An epoxy—modified polyolefin wax, which consists of a low-molecular-weight polyolefin grafted, copolymerized and modified with an epoxy group-containing, ethylenically unsaturated compound represented by the following formula (A) or (B):

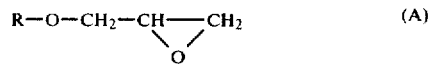  (A)

wherein R stands for a monovalent hydrocarbon group containing a polymerizable ethylenically unsaturated bond, or

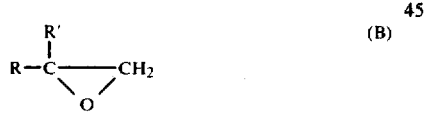  (B)

wherein R stands for a monovalent hydrocarbon group having a polymerizable ethylenically unsaturated bond, and R' stands for a hydrogen atom or an alkyl group having up to 4 carbon atoms, and has a number average molecular weight of from 600 to 10,000 and an epoxy equivalent of from 200 to 100,000.

2. An epoxy-modified polyolefin wax as set forth in claim 1 wherein the number average molecular weight is in the range of from 700 to 6,000 and the epoxy equivalent is in the range of from 200 to 10,000.

3. An epoxy-modified polyolefin wax as set forth in claim 1 wherein the low-molecular-weight polyolefin is a low-molecular-weight polyolefin having an ethylene content of at least 70 mole %.

4. An epoxy-modified polyolefin wax as set forth in claim 1 wherein the epoxy group-containing, ethylenically unsaturated compound is a compound represented by the following formula:

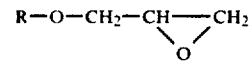

wherein R stands for a monovalent hydrocarbon group containing a polymerizable ethylenically unsaturated bond.

5. An epoxy-modified polyolefin was as set forth in claim 4 wherein the epoxy group-containing, ethylenically unsaturated compound is allyl glycidyl ether or 2-methylallyl glycidyl ether.

6. An epoxy-modified polyolefin wax as set forth in claim 4 wherein the epoxy group-containing, ethylenically unsaturated compound is isopropenylphenyl glycidyl ether or allylphenyl glycidyl ether.

7. An epoxy-modified polyolefin wax as set forth in claim 1 wherein the epoxy group-containing, ethylenically unsaturated compound is a compound represented by the following formula:

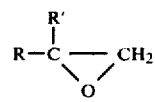

wherein R stands for a monovalent hydrocarbon group having a polymerizable ethylenically unsaturated bond, and R' stands for a hydrogen atom or an alkyl group having up to 4 carbon atoms.

8. An epoxy-modified polyolefin was as set forth in claim 7 wherein the epoxy group-containing, ethylenically unsaturated compound is 2-(allylphenyl)ethylene oxide.

9. An epoxy-modified polyolefin wax as set forth in claim 1 which has a haze less than 3.1% in the molten state.

10. A process for the preparation of epoxy-modified waxes which comprises reacting a polyolefin wax with an epoxy group-containing, ethylenically unsaturated compound in the presence of a radical initiator, wherein (1) the reaction is carried out substantially in the absence of a solvent, (2) the epoxy group-containing, ethylenically unsaturated compound is a member selected from compounds represented by the following formula:

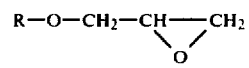

wherein R stands for a monovalent hydrocarbon group containing a polymerizable ethylenically unsaturated bond, and compounds represented by the following formula:

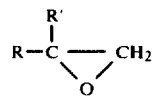

wherein R stands for a monovalent hydrocarbon group having a polymerizable ethylenically unsaturated bond, and R' stands for a hydrogen atom or an alkyl group having up to 4 carbon atoms, and (3) the epoxy group-containing, ethylenically unsaturated compound is fed at a rate of 10$^{-5}$ to 10$^{-2}$ mole/hr per gram of the starting polyolefin wax, whereby an epoxy-modified polyolefin wax having a number average molecular weight of from 600 to 10,000 and an epoxy equivalent of from 200 to 100,000 is obtained.

* * * * *